(12) United States Patent
Diamant et al.

(10) Patent No.: US 8,704,886 B2
(45) Date of Patent: Apr. 22, 2014

(54) METHODS AND APPARATUS TO FORM A WAVELET REPRESENTATION OF A PATHOLOGY SLIDE HAVING GLASS AND TISSUE REGIONS

(75) Inventors: Idit Diamant, Raa'nana (IL); Shai Dekel, Ramat-Hasharon (IL); Alexander Sherman, Modiin (IL); Karel Zuiderveld, Minnetonka, MN (US)

(73) Assignees: General Electric Company, Scenectady, NY (US); Digital Pathco, LLC, Pittsburgh, PA (US)

( * ) Notice: Subject to any disclaimer, the term of this patent is extended or adjusted under 35 U.S.C. 154(b) by 671 days.

(21) Appl. No.: 12/905,781

(22) Filed: Oct. 15, 2010

(65) Prior Publication Data
US 2012/0092476 A1 Apr. 19, 2012

(51) Int. Cl.
*H04N 7/18* (2006.01)
*G06K 9/00* (2006.01)

(52) U.S. Cl.
USPC ........................................... 348/79; 382/128

(58) Field of Classification Search
USPC ....................................................... 382/128
See application file for complete search history.

(56) References Cited

U.S. PATENT DOCUMENTS

| 6,314,452 | B1* | 11/2001 | Dekel et al. ............ 709/203 |
| 6,917,696 | B2 | 7/2005 | Soenksen |
| 7,576,307 | B2 | 8/2009 | Yazdanfar et al. |
| 2006/0159367 | A1* | 7/2006 | Zeineh et al. ............ 382/276 |

OTHER PUBLICATIONS

Garcia Rojo M., et al., "Critical comparison of 31 commercially available digital slide systems in pathology", International Journal of Surgical Pathology, vol. 14, No. 4, Oct. 2006, pp. 285-305. (21 pages).

* cited by examiner

*Primary Examiner* — Andy Rao
*Assistant Examiner* — Tyler Edwards
(74) *Attorney, Agent, or Firm* — Hanley, Flight and Zimmerman, LLC

(57) ABSTRACT

Example methods, apparatus and articles of manufacture to form a wavelet representation of a pathology slide having glass and tissue regions are disclosed. A disclosed example method includes capturing a digital image of a pathology slide, identifying a portion of the digital image that represents a glass portion of the slide, and storing a value representing that the wavelet coefficients for the identified glass portion of the slide are unused without computing a wavelet transform for the identified glass portion.

20 Claims, 5 Drawing Sheets

METHODS AND APPARATUS TO FORM A WAVELET REPRESENTATION OF A PATHOLOGY SLIDE HAVING GLASS AND TISSUE REGIONS

FIELD OF THE DISCLOSURE

This disclosure relates generally to digital pathology and, more particularly, to methods and apparatus to form a wavelet representation of a pathology slide having glass and tissue regions.

BACKGROUND

Traditionally, whole slide imaging is used to capture an image or digital representation of a pathology slide. During whole slide imaging, the entire pathology slide is optically scanned to form a digital representation of the tissue slide. In some examples, the digital representation is subsequently compressed, quantized and/or encoded prior to storage.

BRIEF DESCRIPTION OF THE INVENTION

Example methods, apparatus and articles of manufacture to form a wavelet representation of a pathology slide having glass and tissue regions are disclosed. A disclosed example method includes capturing a digital image of a pathology slide, identifying a portion of the digital image that represents a glass portion of the slide, and storing a value representing that the wavelet coefficients for the identified glass portion of the slide are unused without computing a wavelet transform for the identified glass portion.

A disclosed example apparatus includes an image acquirer to capture a digital image of a pathology slide, an acquisition controller to identify a portion of the digital image that represents a glass portion of the slide, and a coefficient computation module to store an indicator indicating that no wavelet coefficient for the identified glass portion of the slide were stored without computing a wavelet transform for the identified glass portion of the slide.

A disclosed example tangible article of manufacture stores machine-readable instructions that, when executed, cause a machine to at least capture a digital image of a pathology slide, identify a portion of the digital image that represents a glass portion of the slide, and store a flag for the identified glass portion of the slide without computing a wavelet transform for the identified glass portion, the flag representing the wavelet coefficient block associated with the identified glass portion is empty.

DETAILED DESCRIPTION

In general, the examples disclosed herein capture a first or low-resolution digital image of an entire pathology slide, and analyze the first image to identify or distinguish glass regions or portions from tissue or sample-containing regions or portions of the pathology slide. For glass regions, no wavelet coefficients need be stored for or over the glass regions and no wavelet transform need be computed for or over the glass regions. For tissue or sample-containing regions, second or higher-resolution images are captured. One or more wavelet transforms are computed for or over the higher-resolution images to form or generate additional wavelet coefficients, which are combined with the glass region wavelet coefficients to form a wavelet representation of the entire pathology slide. To reduce storage space, the wavelet coefficients may be quantized, compressed and/or encoded prior to storage. Because the glass regions of the pathology slide are represented by, for example, a fixed, pre-assigned or predetermined constant color, the coefficients of wavelet functions supported on these regions are zero, empty, unused and/or blank. Therefore, the time required to scan the pathology slide, to compute the wavelet coefficients and/or compress the wavelet coefficients can be significantly reduced. In some examples, the time to compress an image of the slide is reduced by a percentage that is proportional to the ratio of glass/non-glass on the slide. For example, if x % of the slide is identified as glass, then the example methods disclosed herein may be used to reduce the compression time by x/2%.

Figure 1:
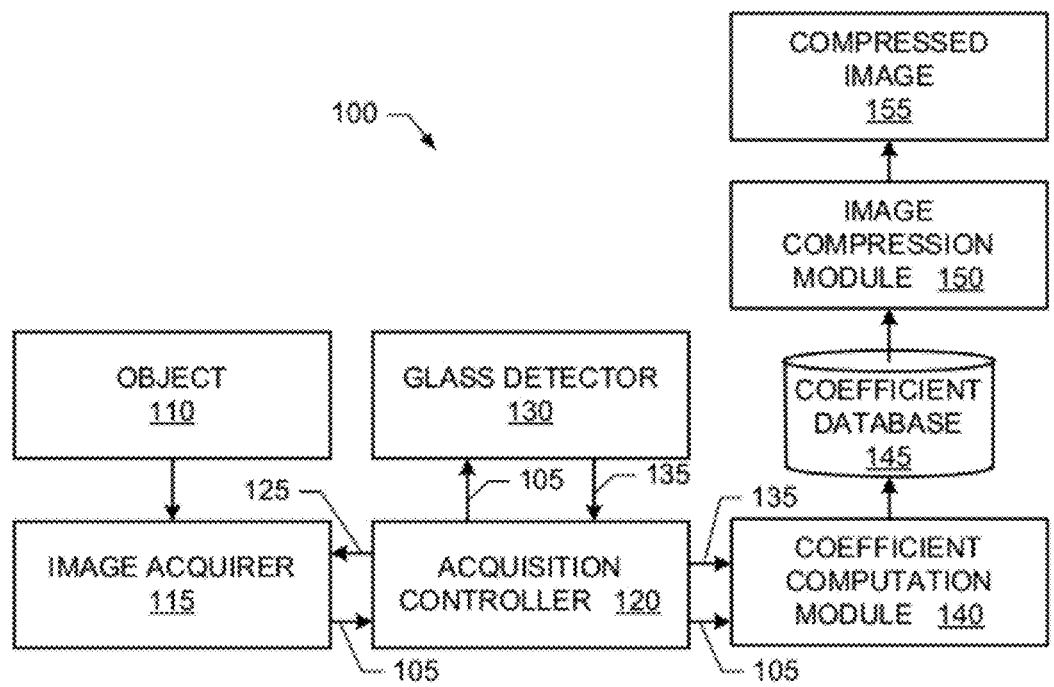
FIG. 1 is a schematic illustration of an example image capture apparatus.

FIG. 1 is a schematic illustration of an example image capture device 100 constructed in accordance with the teachings of this disclosure. To capture images 105 of an object 110, the example image capture device 100 of FIG. 1 includes an image acquirer 115. The example image acquirer 115 of FIG. 1 may be any number and/or type(s) of image capture device(s) capable or configurable to scan, sense, acquire, capture and/or otherwise obtain digital images 105 that represents all or any portion(s) of the object 110. Example image acquirers 115 include, but are not limited to, a digital camera and/or a digital scanner implementing any number and/or type(s) of imaging pipeline(s). The example image acquirer 115 is selectively configurable and/or operable to capture images 105 over different portions of the object 110, at different resolutions and/or at different focal planes.

While the example object 110 of FIG. 1 is a pathology slide, a wavelet representation of any number and/or type(s) of other medical and/or non-medical objects 110 may be captured and/or acquired by the example image capture device 100 of FIG. 1. As used herein, the term "pathology slide" refers to any tissue, fluid and/or any other biological material on a glass slide and/or between glass slides. The tissue, fluid and/or biological material may be human and/or non-human in origin. Further, the tissue, fluid and/or biological material may have been modified (e.g., stained, smeared, sliced, etc.) prior to being placed on the glass slide or between the glass slides. Furthermore, the tissue, fluid and/or biological material need not cover an entire surface of the glass slide(s).

To control the example image acquirer 115, the example image capture device 100 of FIG. 1 includes an acquisition controller 120. The example acquisition controller 120 of FIG. 1 controls, configures and/or operates the image acquirer 115 via control signals and/or paths 125 to focus the image acquirer 115 at a particular focal plane, to select one or more portions or regions of the object 110 to be scanned or imaged, and/or to select the resolution(s) at which the portions or regions are to be scanned or imaged.

Figure 2:
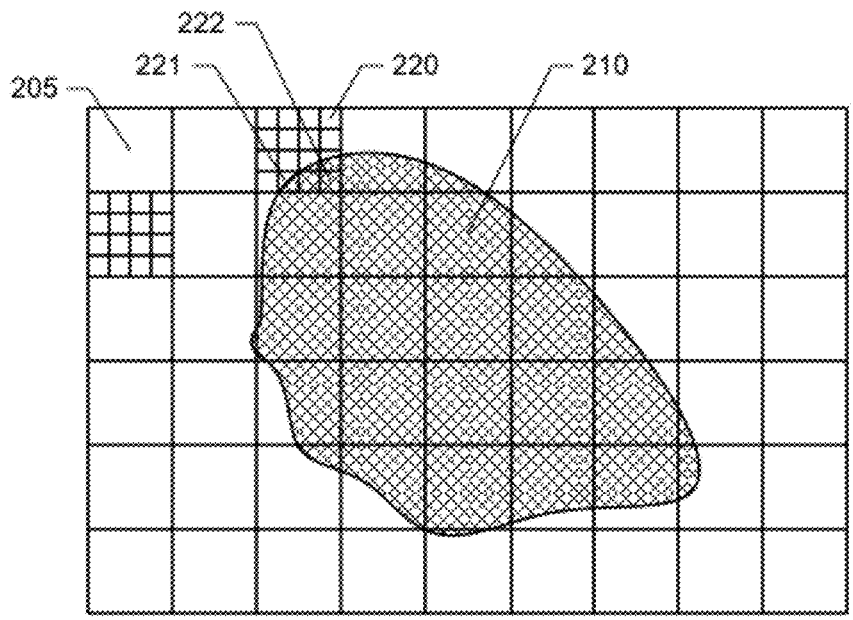
FIG. 2 is an illustration of an example pathology slide.

As shown in FIG. 2, an image 105 of the object 110 may be captured for, over and/or according to different portions, regions, areas and/or tiles of the object 110. As shown in FIG. 2, some portions, regions, areas and/or tiles of the object 110 do not contain tissue, fluid and/or other biological material and, thus, are glass regions, portions, areas and/or tiles. For instance, example tile 205 contains only glass, while example tile 210 is non-glass.

Returning to FIG. 1, to detect glass regions or portions of the object 110, the example image capture device 100 of FIG. 1 includes a glass detector 130. For each image 105, or portion thereof, provided to the glass detector 130 by the acquisition controller 120, the example glass detector 130 of FIG. 1 provides or returns a glass/non-glass indication 135 to the acquisition controller 120. An example glass/non-glass indication 135 is a binary value having a first state or value (e.g., one) when glass is detected and a second state or value (e.g., zero) when non-glass is detected. In the examples described herein, a portion or region is classified as glass when substantially only glass is present. However, it should be understood that the determination of whether any tissue, fluid or biological material is present in the region or portion may be imprecise. Thus, a portion or region may be classified as glass when the portion or region is nearly free of tissue, fluid or biological material and/or contains only small amounts of tissue, fluid and/or biological material. In some examples, a configurable threshold and/or parameter may be used to distinguish glass from non-glass regions. The determination of whether a set of data pixels represents glass may be implemented using any number and/or type(s) of algorithm(s), method(s), logic and/or computation(s). For example, a region or portion of the image 105 can be considered as representing glass when the minimal red (R), green (G) or blue (B) pixel values in that region or portion are greater than a pre-determined threshold. Alternatively, when RGB values are converted to YCbCr data, a portion or region can be considered as representing glass when the minimum luminance (Y) value in that region or portion is greater than a potentially different pre-determined threshold.

The example acquisition controller 120 of FIG. 1 instructs, directs and/or controls the image acquirer 115 to form a first image 105 by pre-scanning the entire object 110 at an initial or low-resolution. For each of the large tiles 205 and 210 of the pre-scan image 105, the acquisition controller 120 provides to the glass detector 130 the corresponding pixels of the pre-scan image 105. For each portion 205, 210 of the pre-scan images 105, the example glass detector 130 of FIG. 1 provides or returns the example glass or non-glass indication 135 to the acquisition controller 120.

Based on the glass/non-glass indication 135 received from the glass detector 130 for a particular large tile 205, 210, the example acquisition controller 120 determines whether to scan that large tile 205, 210 at a second or higher resolution. For example, tile 210 is non-glass and, thus, the acquisition controller 120 instructs, directs and/or controls the image acquirer 115 to scan the tile 210 at the second or higher resolution. As shown in FIG. 2, the second or higher-resolution scan is performed based on or in accordance with smaller tiles or contextual regions 220-222. As shown in FIG. 2, a contextual region 220-222 may contain only glass, only tissue, or a combination of glass and tissue. Although not depicted in FIG. 2, to facilitate compression, reconstruction and/or display of an entire 2D image from the images 105 of the constituent small tiles 220-222, in some examples the small tiles 220-221 partially overlap adjacent tiles 220-222. Additionally or alternatively, the small tiles 220-221 may be scanned as constituents of partially overlapping horizontal strips. As the small tiles 220-221 are scanned, the glass detector 130 determines whether they are glass or non-glass tiles.

Returning to FIG. 1, to compute wavelet coefficients, the example image capture device 100 of FIG. 1 includes a coefficient computation module 140. Using any number and/or type(s) of computation(s), algorithm(s), filter(s), logic, and/or method(s), the example coefficient computation module 140 computes a discrete wavelet transform (DWT) of a series of images 105 corresponding to the various small tiles 220-222 to form a multiresolution wavelet representation of the object 110.

Figure 3A:
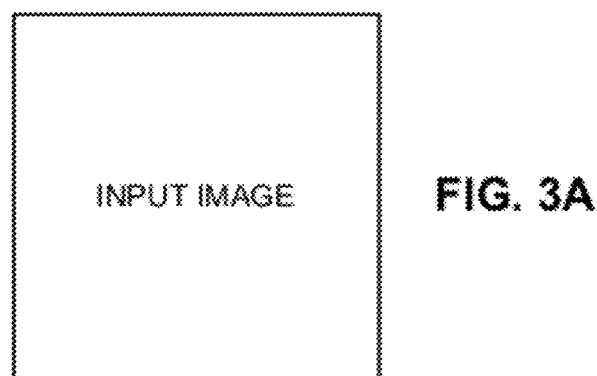
FIGS. 3A-D illustrates an example sub-band coding of an image.
Figure 3B:
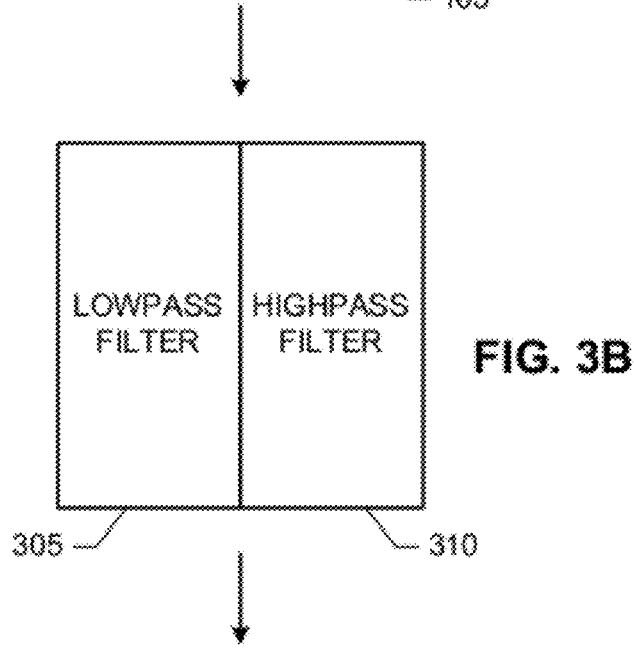
Figure 3C:
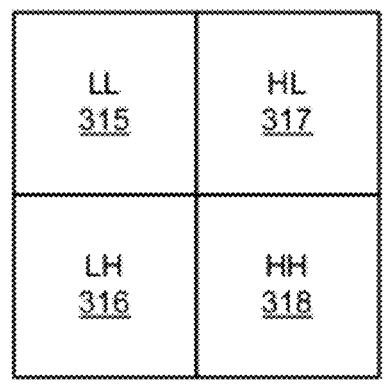
Figure 3D:
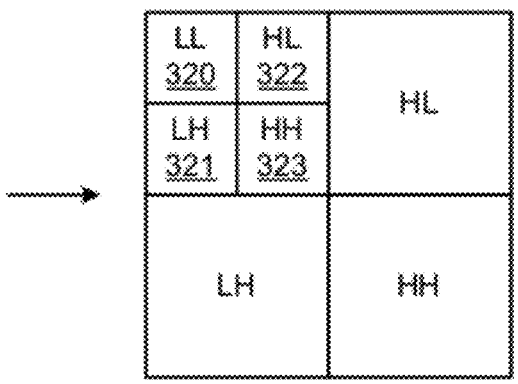

FIGS. 3A-D illustrate example results of a DWT applied to an image 105 (FIG. 3A). Applying the DWT to the example image 105 of FIG. 3A results in four sub-bands LL 315, LH 316, HL 317 and HH 318 as shown in FIGS. 3C. Each of the sub-bands 315-318 corresponds to a filter combination applied to the image 105 in the x and y directions. A low-pass filter (LPF), which is a 1D transform, is applied to the input image 105 (FIG. 3A), which is a 2D input matrix, in the x-direction to yield low-pass intermediary results 305 (FIG. 3B). A high-pass filter (HPF), which is another 1D transform, is applied to the input image in the x-direction to yield high-pass intermediary results 310. The LPF and HPF are applied to the low-pass intermediary results 305 in the y-direction to yield LL and LH sub-band coefficients 315 and 316 (FIG. 3C), respectively. The LPF and HPF are applied to the high-pass intermediary results 310 in the y-direction to yield HL and HH sub-band coefficients 317 and 318, respectively. Applying the DWT to the output LL sub-band 315, which is a lower resolution image, results in additional four sub-bands LL 320, LH 321, HL 322 and HH 323, as shown in FIG. 3D. When the process illustrated in FIGS. 3A-D is applied recursively a multi-resolution pyramid is obtained, see FIG. 4. At each iteration, additional lower resolution representations are formed by applying the DWT on the LL sub-band 315, 320 output of the previous resolution.

Figure 4:
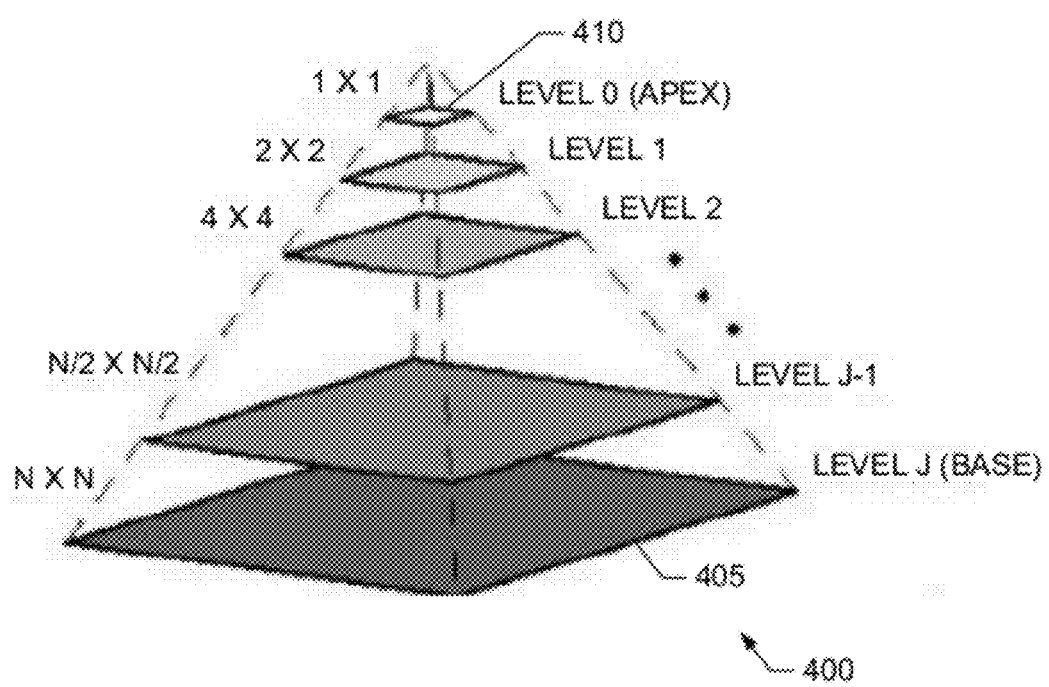
FIG. 4 is an illustration of an example image representation pyramid.

The example image pyramid 400 of FIG. 4 depicts a multiresolution representation of an image 105. The base 405 of the image pyramid 400 is the original image 105 (highest resolution image) and the top 410 of the pyramid 400 is the lowest resolution image. A lower resolution image is constructed by smoothing the previous (higher resolution) image in the pyramid (using a LPF) and downsampling.

Returning to FIG. 1, as described above, as the object 110 is scanned, each area 205, 210, 220-222 is identified as glass or non-glass. Pixel data 105 representing each small tile 220-222 is provided to the coefficient computation module 140. The corresponding glass/non-glass indication 135 is also provided to the coefficient computation module. Because the example multiresolution representation shown in FIG. 4 is based on small tiles, for a large tile that was identified as glass by the glass detector 130 (e.g., the large tile 205), the acquisition controller 120 need only provide an indication 135 that each of small tiles 220-222 of that large tile are glass. No pixel data 105 need be provided for the small tiles 220-222 that are glass.

For each small tile 220-220 identified as non-glass, the coefficient computation module 140 computes a DWT and stores the computed wavelet coefficients in a coefficient database 145. For each small tile 220-222 identified as glass, the coefficient computation module 140 does not compute a DWT as the small tile 220-22 contains no information. Instead, the coefficient computation module 140 stores in the coefficient database 145 a value, flag, indicator, etc. (e.g., one bit having a value of zero) to indicate that the wavelet coefficients for this tile (LH, HL and HH sub-bands) are empty, blank, zero and/or unused. In some examples, the next lower resolution pixels (e.g., the LL sub-band) are assigned a constant value which represents a glass value multiplied by 2 (results of applying a LPF). Additional lower resolutions are processed as before by applying the DWT at each resolution. In other examples, the lower resolution is marked as glass and processed like the higher resolution glass tile.

While examples disclosed herein are described with reference to large and small tiles, the examples disclosed may also be used with other shaped tiles, and/or with only single sized regions. While in some examples using only singled sized regions, all regions are scanned at the higher resolution, the determination of glass vs. non-glass is used to indicate whether to compute a wavelet transform for glass regions.

Wavelet coefficients, information and/or data can be stored in the example coefficient database 145 of FIG. 1 using any number and/or type(s) of data structures. The example coefficient database 145 may be implemented using any number and/or type(s) of volatile and/or non-volatile memory(-ies), memory device(s) and/or storage device(s).

To further reduce the amount of data needed to represent a compressed representation 155 of the object 110, the example image capture device 100 of FIG. 1 includes an image compression module 150. Using any number and/or type(s) of algorithm(s), method(s) and/or logic, the example image compression module 150 processes the wavelet coefficients stored in the coefficient database 145 for the object 110 to further reduce redundancy and/or to reduce the amount of data needed to store and/or represent the wavelet coefficients. For example, the wavelet coefficients may be quantized, and/or entropy encoded according to their tree-structure using, for example, a so-called "zero-tree" compression algorithm. In some examples, local groups of wavelet coefficients at given scales are compressed into different data blocks. By grouping wavelet coefficients in different data blocks, only a portion of the compressed image 155 needs to be extracted to begin reconstructing an image of the object 110. Such groupings of wavelet coefficients facilitate the rendering of only a particular region-of-interest of the object 110, and/or facilitate the progressive reconstruction with increasing resolution as the remainder of the compressed image 155 is extracted and/or received. The example compressed image 155 may be stored using any number and/or type(s) of data structures in any number and/or type(s) of memory(-ies), memory device(s) and/or storage device(s).

While an example image capture device 100 has been illustrated in FIG. 1, one or more of the elements, processes and/or devices illustrated in FIG. 1 may be combined, divided, re-arranged, omitted, eliminated and/or implemented in any other way. Further, the example image acquirer 115, the example acquisition controller 120, the example glass detector 130, the example coefficient computation module 140, the example image compression module 150 and/or, more generally, the example image capture device 100 of FIG. 1 may be implemented by hardware, software, firmware and/or any combination of hardware, software and/or firmware. Thus, for example, any of the example image acquirer 115, the example acquisition controller 120, the example glass detector 130, the example coefficient computation module 140, the example image compression module 150 and/or the image capture device 100 could be implemented by the example process platform P100 of FIG. 6 and/or one or more circuit(s), programmable processor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example image acquirer 115, the example acquisition controller 120, the example glass detector 130, the example coefficient computation module 140, the example image compression module 150 and/or the image capture device 100 are hereby expressly defined to include a tangible article of manufacture such as a tangible computer-readable medium storing the firmware and/or software. Further still, the example image capture device 100 of FIG. 1 may include one or more elements, processes and/or devices in addition to, or instead of, those illustrated in FIG. 1, and/or may include more than one of any or all of the illustrated elements, processes and devices.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 6. As used herein, the term non-transitory computer-readable medium is expressly defined to include any type of computer-readable medium and to exclude propagating signals.

Figure 5:
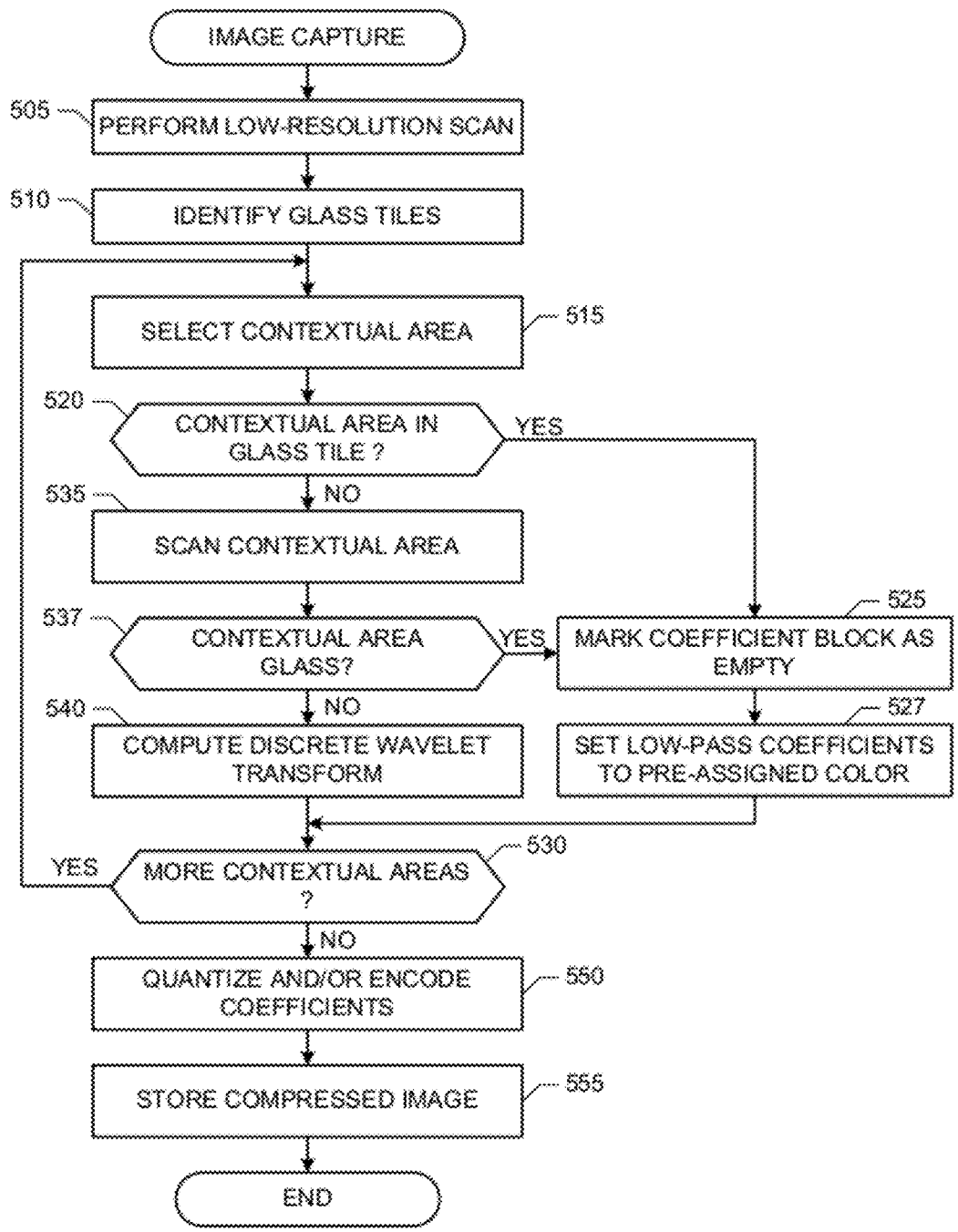
FIG. 5 is a flowchart representative of an example process that may be embodied as machine-accessible instructions and executed by, for example, one or more processors to implement the example image capture apparatus of FIG. 1.

A flowchart representative of an example process that may be, for example, embodied in machine-readable instructions and executed to implement the example image capture device 100 of FIG. 1 shown in FIG. 5. A processor, a controller and/or any other suitable processing device may be used, configured and/or programmed to execute the example machine-readable instructions represented in FIG. 5. For example, the machine-readable instructions of FIG. 5 may be embodied in coded instructions stored on a tangible computer-readable medium. Machine-readable instructions comprise, for example, instructions that cause a processor, a computer and/or a machine having a processor to perform one or more particular processes. Alternatively, some or all of the example process of FIG. 5 may be implemented using any combination(s) of ASIC(s), PLD(s), FPLD(s), FPGA(s), discrete logic, hardware, firmware, etc. Also, some or all of the example process of FIG. 5 may be implemented manually or as any combination of any of the foregoing techniques, for example, any combination of firmware, software, discrete logic and/or hardware. Further, many other methods of implementing the example operations of FIG. 5 may be employed. For example, the order of execution of the blocks may be changed, and/or one or more of the blocks described may be changed, eliminated, sub-divided, or combined. Additionally, the blocks of any or all of the example process of FIG. 5 may be carried out sequentially and/or carried out in parallel by, for example, separate processing threads, processors, devices, discrete logic, circuits, etc.

The example process of FIG. 5 begins with the example acquisition controller 120 and the example image acquirer 115 performing an initial or low-resolution scan of the object 110 (block 505). For each region or large tile (e.g., the example large tiles 205 and 210), the example glass detector 130 determines whether the region or large tile is glass (block 510).

Starting with a first contextual area or small tile of a first large tile (block 515), the example acquisition controller 120 determines whether the glass detector 130 determined that the large tile was glass (block 520). If the large tile was identified as glass (block 520), the coefficient computation module 149 stores in the coefficient database 145 a value (e.g., one bit having a value of zero) to indicate that the wavelet coefficients for this tile (LH, HL and HH sub-bands) for each color component are blank, empty and/or unused (block 525). The coefficient computation module 149 also sets the next lower resolution pixels (e.g., the LL sub-band) to a pre-assigned and/or pre-determined color (block 527). If there are more contextual areas or small tiles to process (block 530), control returns to block 515 to select the next contextual area or small tile.

Returning to block 520, if the large tile was not identified as glass (block 520), the acquisition controller 120 and the image acquirer 115 scan the contextual area or small tile at a second or higher resolution (block 535). If the scanned contextual area or small tile is identified as glass (block 537), control proceeds to block 525 to mark the wavelet coefficients for the contextual area as blank, empty and/or unused.

If the scanned contextual area or small tile is identified as non-glass (block 537), the coefficient computation module 140 computes a DWT for the scanned small tile (block 540). If there are more contextual areas or small tiles to process (block 530), control returns to block 515 to select the next contextual area or small tile. In some examples, the determination at block 537 whether the scanned contextual area is glass is not implemented, and a wavelet transform is computed for any contextual area scanned at the second or higher resolution. However, implementing the determination at block 537 results in a higher quality (e.g., smoother, less jagged, few discontinuities, etc.) digital representation of the object 110.

If there are no more contextual areas of small tiles to process (block 530), the example image compression module 150 quantizes, compresses and/or encodes the wavelet coefficients (block 550) and stores the, potentially compressed or encoded, multiresolution wavelet representation 155 (block 555). Control then exits from the example process of FIG. 5.

Figure 6:
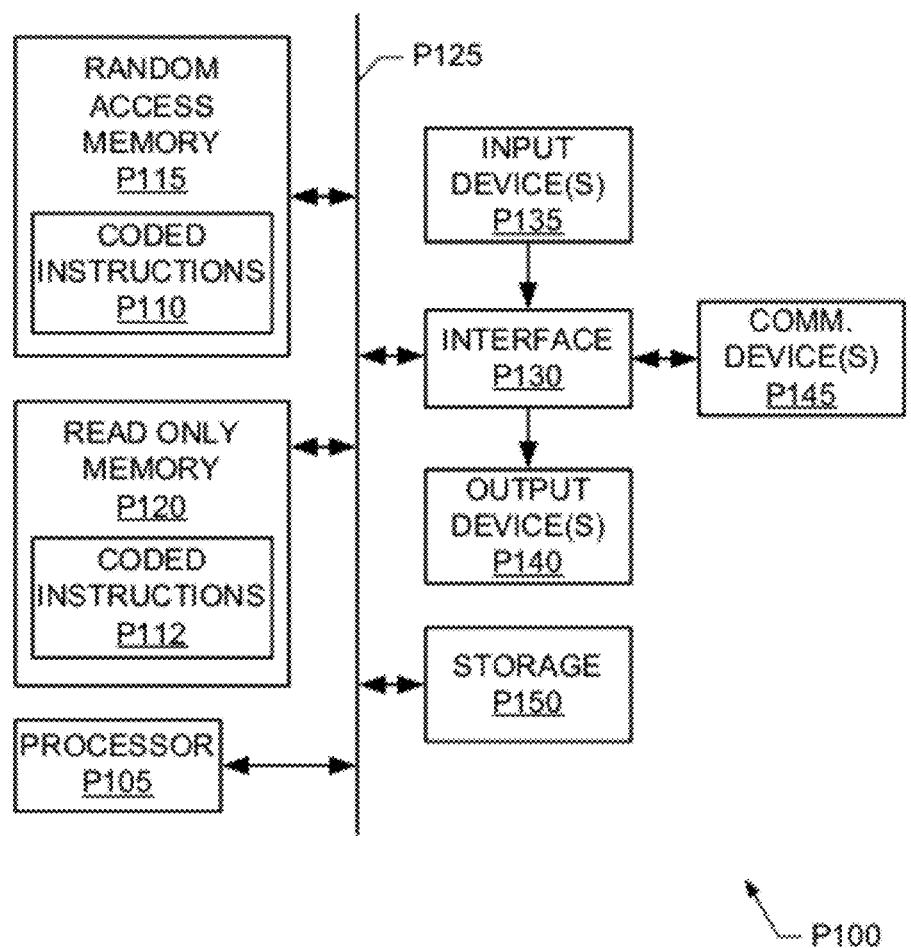
FIG. 6 is a schematic illustration of an example processor platform that may be used and/or programmed to execute the example machine-accessible instructions represented by FIG. 5 to implement an image capture apparatus.

FIG. 6 is a block diagram of an example processor platform P100 that may be used and/or programmed to execute the example instructions of FIG. 5 to implement the example image capture device 100 of FIG. 1. One or more general-purpose processors, processor cores, microcontrollers, etc may be used to implement the processor platform P100. The processor platform P100 can be, for example, a server, a workstation, a router, a network switch, and/or any other type of computing device containing a processor.

The processor platform P100 of the instant example includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIG. 5 to implement a scalable MPLS-based network. Thus, the coded instructions P110, P112 may include the example instructions of FIG. 5.

The processor P105 is in communication with the main memory including a ROM P110 and the RAM P115 via a bus P125. The RAM P115 may be implemented by Synchronous Dynamic Random Access Memory (SDRAM), Dynamic Random Access Memory (DRAM), RAMBUS Dynamic Random Access Memory (RDRAM) and/or any other type of RAM device. The ROM P110 may be implemented by flash memory and/or any other desired type of memory device. Access to the memory P115 and the memory P120 may be controlled by a memory controller. The example memory P115 and P120 may be used to, for example, store the example coefficient database 145 and/or the example compressed image 155 of FIG. 1.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

One or more input devices P135 may be connected to the interface circuit P130. The input device(s) P135 may be used to, for example, permit a user to enter data and commands into the processor P105. The input device(s) P135 can be implemented by, for example, a keyboard, a mouse, a touchscreen, a track-pad, and/or a trackball.

One or more output devices P140 are also connected to the interface circuit 1020. The output devices P140 can be implemented, for example, by display devices (e.g., a liquid crystal display, a cathode ray tube display (CRT), and/or a printer). The interface circuit P130 may, thus, include a graphics driver card. The interface circuit P130 may also includes one or more communication device(s) 145 such as a network interface card to facilitate exchange of data with external computers via a network.

In some examples, the processor platform P100 also includes one or more storage devices P150 to store software and data. Examples of such storage devices P150 include a floppy disk drive, a hard disk drive, a solid-state hard disk drive, a CD drive, a DVD drive and/or any other solid-state, magnetic and/or optical storage device. The example storage 150 may be used to, for example, store the example coefficient database 145 and/or the example compressed image 155 and/or the example coded instructions of FIG. 5.

Generally, computer-executable instructions include routines, programs, objects, components, data structures, etc., that perform particular tasks or implement particular abstract data types. Computer-executable instructions, associated data structures, and program modules represent examples of program code for executing the processes to implement the example methods and systems disclosed herein. The particular sequence of such executable instructions and/or associated data structures represent examples of corresponding acts for implementing the examples described herein.

The example methods and apparatus described herein may be practiced in a networked environment using logical connections to one or more remote computers having processors. Logical connections may include a local area network (LAN) and a wide area network (WAN) and are presented here by way of example and not limitation. Such networking environments are commonplace in office-wide or enterprise-wide computer networks, intranets and the Internet and may use a wide variety of different communication protocols. Such networking computing environments may encompass many types of computer system configurations, including personal computers, hand-held devices, multi-processor systems, microprocessor-based or programmable consumer electronics, network PCs, minicomputers, mainframe computers, and the like. The example methods and apparatus described herein may, additionally or alternatively, be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
capturing a digital image of a pathology slide;
identifying at a first resolution a first portion of the digital image comprising a first glass portion of the pathology slide;
storing a value representing wavelet coefficients for the identified first glass portion of the pathology slide are unused without computing a wavelet transform for the identified first glass portion;
identifying at the first resolution a second portion of the digital image comprising a second glass portion of the pathology slide and a non-glass portion;
capturing a digital image of the second portion at a second resolution greater than the first resolution;
storing the value for the identified second glass portion of the pathology slide at the second resolution without computing the wavelet transform for the identified second glass portion; and
computing the wavelet transform of the non-glass portion of the digital image of the second portion to form a non-glass wavelet coefficient representing the identified non-glass portion.

2. A method as defined in claim 1, wherein capturing the digital image comprises scanning an entirety of the pathology slide at a first resolution, and the value is stored for the first portion without scanning the first portion of the pathology slide at the second resolution.

3. A method as defined in claim 1, wherein the value comprises a one-bit value to identify the identified first and second glass portions as glass.

4. A method as defined in claim 1, wherein the value is stored for a first color, and further comprising storing a second value for a second color without computing the wavelet transform for the identified first and second glass portions.

5. A method as defined in claim 1, further comprising:
storing the value for a first sub-band; and
storing a second value for a second sub-band without computing the wavelet transform for the identified glass portion.

6. A method as defined in claim 1, further comprising:
identifying a third portion of the digital image at the first resolution comprising a second non-glass portion of the pathology slide;
capturing a digital image of the second non-glass portion of the pathology slide at the second resolution; and
computing a wavelet transform of the digital image of the second non-glass portion to form a non-glass wavelet coefficient representing the second non-glass portion of the pathology slide.

7. A method as defined in claim 6, further comprising quantizing the non-glass wavelet coefficient.

8. A method as defined in claim 6, further comprising compressing the non-glass wavelet coefficient.

9. A method as defined in claim 1, further comprising identifying the first glass portion or the second glass portion by comparing at least one of a minimum luminance component, a minimum red component, a minimum blue component, or a minimum green component to a threshold.

10. An apparatus comprising:
an image acquirer to capture a digital image of a pathology slide;
an acquisition controller to identify at a first resolution a first portion of the digital image comprising a first glass portion of the pathology slide and a second portion of the digital image comprising a second glass portion of the pathology slide and a non-glass portion, the image acquirer to capture a digital image of the second portion at a second resolution greater than the first resolution; and
a coefficient computation module to:
store an indicator indicating that no wavelet coefficients for the identified first glass portion of the pathology slide were stored without computing a wavelet transform for the identified first glass portion of the pathology slide,
store the indicator for the identified second glass portion of the pathology slide at the second resolution without computing the wavelet transform for the identified second portion; and
compute the wavelet transform of the non-glass portion of the digital image of the second portion to form a non-glass wavelet coefficient representing the identified non-glass portion.

11. An apparatus as defined in claim 10, wherein the indicator comprises a one-bit value to identify the identified first and second glass portions as glass.

12. An apparatus as defined in claim 10, wherein the coefficient computation module is to store the indicator for a first color, and store a second indicator for a second color without computing the wavelet transform for the identified first and second glass portions.

13. An apparatus as defined in claim 10, wherein the acquisition controller is to identify a third portion of the digital image at the first resolution comprising a second non-glass portion of the pathology slide;
the image acquirer is to capture a digital image of the second non-glass portion of the pathology slide at the second resolution; and
the coefficient computation module is to compute a wavelet transform of the digital image of the second non-glass portion to form a non-glass wavelet coefficient representing the second non-glass portion of the pathology slide.

14. An apparatus as defined in claim 13, further comprising a compression module to quantize the non-glass wavelet coefficient.

15. An apparatus as defined in claim 13, further a compression module to compress the non-glass wavelet coefficient.

16. An apparatus as defined in claim 10, wherein the image acquirer is further to identify the first glass portion or the second glass portion by comparing at least one of a minimum luminance component, a minimum red component, a minimum blue component, or a minimum green component to a threshold.

17. A tangible article of manufacture storing machine-readable instructions that, when executed, cause a machine to at least:
capture a digital image of a pathology slide;
identify at a first resolution a first portion of the digital image comprising a first glass portion of the pathology slide;
store a flag for the identified first glass portion of the pathology slide without computing a wavelet transform for the identified glass portion, the flag representing that a wavelet coefficient block associated with the identified glass portion is empty;
identify at the first resolution a second portion of the digital image comprising a second glass portion of the pathology slide and a non-glass portion;
capture a digital image of the second portion at a second resolution greater than the first resolution;
store the flag for the identified second glass portion of the pathology slide at the second resolution without computing the wavelet transform for the identified second glass portion; and
compute the wavelet transform of the of the non-glass portion digital image of the second portion to form a non-glass wavelet coefficient representing the identified non-glass portion.

18. An article of manufacture as defined in claim 17, wherein the flag comprises a one-bit value to identify the identified first and second glass portions as glass.

19. An article of manufacture as defined in claim 17, wherein the machine-readable instructions, when executed, cause the machine to:
store the flag for a first sub-band coefficient; and
store a second flag for a second sub-band without computing the wavelet transform.

20. An article of manufacture as defined in claim 17, wherein the machine-readable instructions, when executed, cause the machine to:
identify a third portion of the digital image at the first resolution comprising a second non-glass portion of the pathology slide;
capture a digital image of the second non-glass portion of the pathology slide at the second resolution; and
compute a wavelet transform of the digital image of the second non-glass portion to form a non-glass wavelet coefficient representing the second non-glass portion of the pathology slide.

\* \* \* \* \*